United States Patent
Shiose

(10) Patent No.: US 10,498,930 B2
(45) Date of Patent: Dec. 3, 2019

(54) IMAGE FORMING APPARATUS

(71) Applicant: KYOCERA Document Solutions Inc., Osaka (JP)

(72) Inventor: Masato Shiose, Osaka (JP)

(73) Assignee: KYOCERA Document Solutions Inc., Osaka (JP)

(*) Notice: Subject to any disclaimer, the term of this patent is extended or adjusted under 35 U.S.C. 154(b) by 0 days.

(21) Appl. No.: 15/990,194

(22) Filed: May 25, 2018

(65) Prior Publication Data

US 2018/0343364 A1 Nov. 29, 2018

(30) Foreign Application Priority Data

May 29, 2017 (JP) .................... 2017-105214

(51) Int. Cl.
*H04N 1/60* (2006.01)
*H04N 1/58* (2006.01)
(Continued)

(52) U.S. Cl.
CPC ....... *H04N 1/6094* (2013.01); *G06Q 10/1095* (2013.01); *H04N 1/0036* (2013.01); *H04N 1/00366* (2013.01); *H04N 1/00374* (2013.01); *H04N 1/00376* (2013.01); *H04N 1/58* (2013.01); *H04N 1/6047* (2013.01); *H04N 1/6097* (2013.01)

(58) Field of Classification Search
None
See application file for complete search history.

(56) References Cited

U.S. PATENT DOCUMENTS

RE32,655 E * 4/1988 Levine ................. G04B 47/003
368/251
5,563,999 A * 10/1996 Yaksich ................ G06F 17/2264
715/209

(Continued)

FOREIGN PATENT DOCUMENTS

JP H 07-250237 A 9/1999

OTHER PUBLICATIONS

Extended European Search Report dated Oct. 12, 2018, issued by the European Patent Office in corresponding application EP 18174613.2.

(Continued)

*Primary Examiner* — Anh-Vinh T Nguyen
(74) *Attorney, Agent, or Firm* — Stein IP, LLC

(57) ABSTRACT

An image forming apparatus is provided with a storage portion that stores a plurality of pieces of schedule information, an image reading portion that generates image data of an original document including a plurality of description fields, a printing portion, and a control portion that recognizes a plurality of description field regions corresponding to the plurality of description fields, respectively, recognizes in-field information that is included in each of the plurality of description field regions in association with a date borne by a corresponding one of the plurality of description fields, extracts one of the plurality of pieces of schedule information and a piece of the in-field information which correspond to a common date as first subject information and second subject information, respectively, and performs control so that an update information image is printed.

5 Claims, 9 Drawing Sheets

(51) Int. Cl.
*G06Q 10/10* (2012.01)
*H04N 1/00* (2006.01)

(56) References Cited

U.S. PATENT DOCUMENTS

| | | | | |
|---|---|---|---|---|
| 5,948,040 | A * | 9/1999 | DeLorme | G01C 21/36 340/990 |
| 6,549,939 | B1 | 4/2003 | Ford et al. | 709/217 |
| 7,039,596 | B1 * | 5/2006 | Lu | G06Q 10/06311 705/7.13 |
| 7,636,044 | B1 * | 12/2009 | Callaghan | G05B 19/4183 340/572.1 |
| 8,918,807 | B2 * | 12/2014 | Alexander | H04N 5/44543 725/34 |
| 9,036,181 | B2 * | 5/2015 | Chang | G06F 3/1245 358/1.15 |
| 9,058,595 | B2 * | 6/2015 | Coffman | G06Q 10/109 |
| 9,690,864 | B2 * | 6/2017 | Yu | G06Q 10/109 |
| 2003/0065677 | A1 | 4/2003 | Culp et al. | 707/104.1 |
| 2003/0154116 | A1 * | 8/2003 | Lofton | G06Q 10/109 705/7.19 |
| 2004/0243547 | A1 * | 12/2004 | Chhatrapati | G06Q 10/06 |
| 2005/0060198 | A1 * | 3/2005 | Bayne | A61B 5/411 705/2 |
| 2006/0247961 | A1 * | 11/2006 | Klemow | G06Q 10/06314 705/7.24 |
| 2006/0265263 | A1 * | 11/2006 | Burns | G06Q 10/109 705/80 |
| 2007/0143399 | A1 * | 6/2007 | Qi | G06Q 10/06311 709/204 |
| 2007/0168228 | A1 * | 7/2007 | Lawless | G06F 19/3418 705/2 |
| 2007/0234919 | A1 * | 10/2007 | Lappe | B41F 19/062 101/488 |
| 2008/0207232 | A1 * | 8/2008 | Rice | G06F 16/972 455/466 |
| 2008/0270211 | A1 * | 10/2008 | Vander Veen | G06Q 10/107 705/7.19 |
| 2008/0319818 | A1 * | 12/2008 | Gurdin | G06Q 10/06314 705/7.24 |
| 2010/0223089 | A1 * | 9/2010 | Godfrey | G06Q 10/109 705/7.19 |
| 2011/0161453 | A1 * | 6/2011 | Feliberti | G06Q 10/109 709/207 |
| 2011/0184974 | A1 * | 7/2011 | Rawal | G06Q 10/109 707/769 |
| 2012/0029964 | A1 * | 2/2012 | Tengler | G06Q 10/1095 705/7.19 |
| 2012/0254301 | A1 * | 10/2012 | Fiero | G06F 16/951 709/203 |
| 2013/0073325 | A1 * | 3/2013 | Ross | G06Q 10/02 705/6 |
| 2013/0191719 | A1 * | 7/2013 | Underhill | G06Q 10/10 715/231 |
| 2013/0229686 | A1 * | 9/2013 | Blohm | G06Q 30/02 358/1.15 |
| 2013/0242708 | A1 * | 9/2013 | Siu | G06Q 10/109 368/10 |
| 2014/0310044 | A1 * | 10/2014 | Meltzer | G06Q 10/1095 705/7.19 |
| 2014/0310045 | A1 * | 10/2014 | Meltzer | G06Q 10/1095 705/7.19 |
| 2015/0006221 | A1 * | 1/2015 | Mermelstein | G06Q 10/1093 705/7.19 |
| 2015/0143303 | A1 * | 5/2015 | Sarrazin | G06F 3/0482 715/854 |
| 2015/0149203 | A1 * | 5/2015 | Csurka | G06Q 10/1095 705/3 |
| 2015/0220887 | A1 * | 8/2015 | Peres | G06Q 10/1095 705/7.19 |
| 2015/0262131 | A1 * | 9/2015 | Mermelstein | G06Q 10/1095 705/5 |
| 2015/0347982 | A1 * | 12/2015 | Jon | G06Q 10/1095 705/7.19 |
| 2015/0371197 | A1 * | 12/2015 | Mermelstein | G06Q 10/1095 705/7.19 |
| 2016/0179771 | A1 * | 6/2016 | Mizumoto | G06F 17/2247 715/273 |
| 2017/0024704 | A1 * | 1/2017 | Tompkins | G06Q 10/1095 |
| 2017/0039529 | A1 * | 2/2017 | Reicher | H04L 67/22 |
| 2017/0046656 | A1 * | 2/2017 | Bramble | G06Q 10/08 |
| 2017/0341375 | A1 * | 11/2017 | Menezes | G06F 3/1208 |
| 2018/0091682 | A1 * | 3/2018 | Kamasuka | H04N 1/00244 |
| 2018/0174110 | A1 * | 6/2018 | Cvetkovic | G06Q 10/1095 |
| 2018/0330013 | A1 * | 11/2018 | Liden | G06Q 10/1095 |
| 2018/0343364 | A1 * | 11/2018 | Shiose | H04N 1/6094 |
| 2019/0139002 | A1 * | 5/2019 | Kumar | G06Q 10/1095 |

OTHER PUBLICATIONS

Chinese Office Action dated Jul. 12, 2019, issued by the National Intellectual Property Administration in corresponding application CN 201810521469.8.

Japanese Office Action dated Jul. 12, 2019, issued by the Japanese Patent Office in corresponding application JP 201810521469.8.

* cited by examiner

| | | | |
|---|---|---|---|
| NOV. 20TH | | — | ← 10 |
| NOV. 21ST | 09:00-10:00 | AAA MEETING | ← 10 |
| | 11:00-12:00 | FFF MEETING | ← 10 |
| | 13:00-15:00 | EXPECTING VISITOR | ← 10(ADDED) |
| NOV. 22ND | 09:00-10:00 | BBB MEETING | ← 10 |
| | 17:00-19:00 | JOB-WELL-DONE PARTY | ← 10 |
| NOV. 23RD | | — | ← 10 |
| NOV. 24TH | 09:00-10:00 | CCC MEETING | ← 10 |
| | 13:00-15:00 | DDD MEETING | ← 10 |
| NOV. 25TH | 13:00-15:00 | EEE MEETING | ← 10 |
| NOV. 26TH | | — | ← 10 |

SD

IMAGE FORMING APPARATUS

INCORPORATION BY REFERENCE

This application is based upon and claims the benefit of priority from the corresponding Japanese Patent Application No. 2017-105214 filed on May 29, 2017, the entire contents of which are incorporated herein by reference.

BACKGROUND

The present disclosure relates to an image forming apparatus that reads an original document and performs printing based thereon.

Conventionally, there is known an image forming apparatus that accepts, from a user, an update (such as an addition of information) to information described in a read original document. This conventional type of image forming apparatus generates image data of an additional image indicating the additional information added by the user. Then, the conventional image forming apparatus overprints the additional image on the original document to be updated (the read original document). In this manner, the information described in the original document to be updated is updated.

SUMMARY

An image forming apparatus according to one aspect of the present disclosure is provided with a storage portion, an image reading portion, a printing portion, and a control portion. The storage portion stores schedule data that is obtained from a user terminal used by a user of the image forming apparatus and includes a plurality of pieces of schedule information corresponding to a plurality of dates, respectively. The image reading portion reads an original document including a plurality of description fields bearing different dates from each other and generates image data of the original document. The printing portion performs printing on a sheet. The control portion recognizes a plurality of description field regions in the image data of the original document which correspond to the plurality of description fields, respectively, performs a process in which, with respect to each of the plurality of description field regions, in-field information that is included in the each of the plurality of description field regions is recognized in association with a date borne by a corresponding one of the plurality of description fields, also performs a process in which one of the plurality of pieces of schedule information and a piece of the in-field information which correspond to a common date are extracted as first subject information and second subject information, respectively, and information that is present in the first subject information and absent in the second subject information is determined as first update information, and controls the printing portion to perform printing of an update information image indicating the first update information on the sheet.

DETAILED DESCRIPTION

<Apparatus Configuration>

Figure 1:
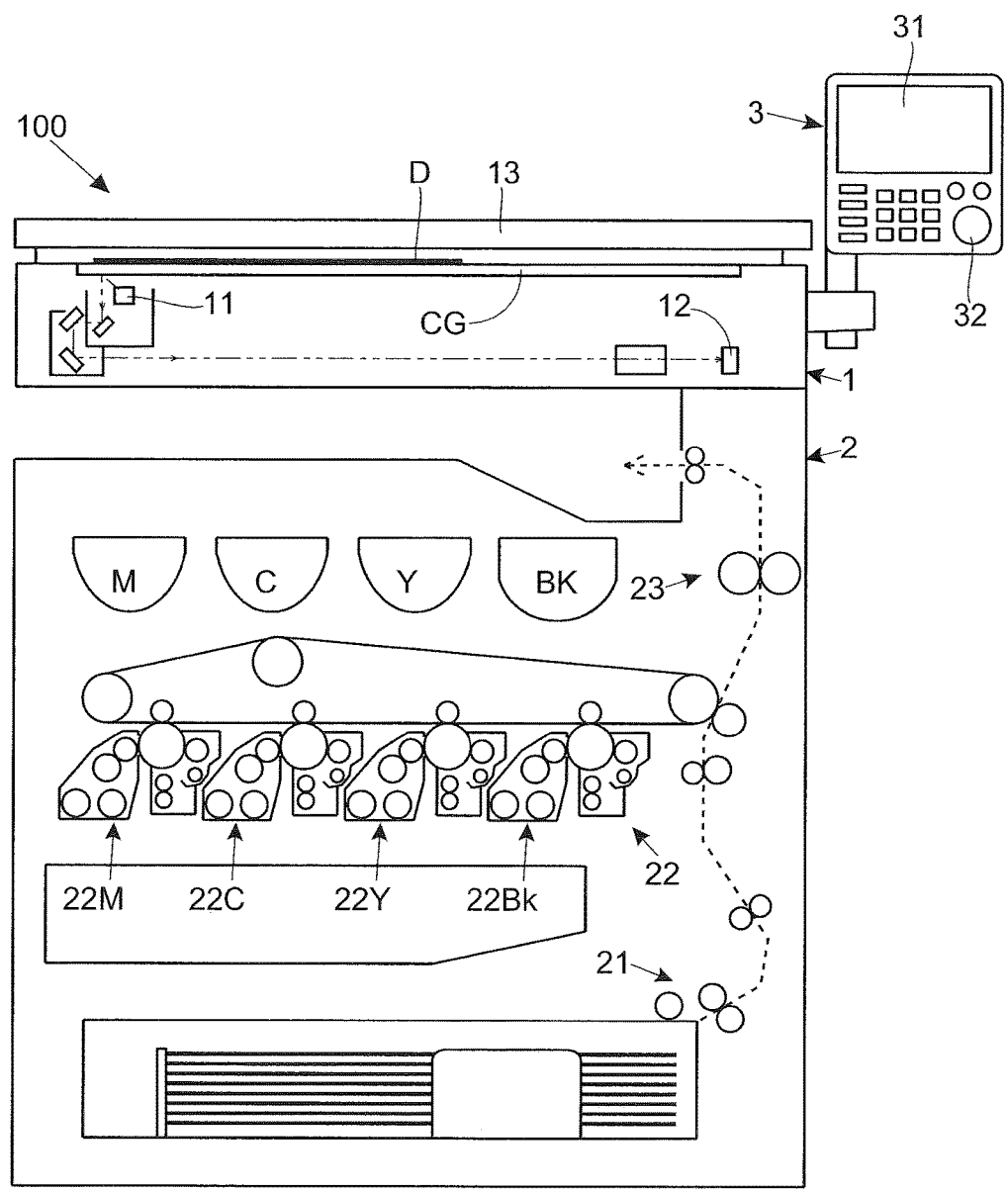
FIG. 1 is a view showing an overall configuration of an image forming apparatus according to one embodiment of the present disclosure.

As shown in FIG. 1, an image forming apparatus 100 according to this embodiment is provided with an image reading portion 1. The image reading portion 1 reads an original document D and generates image data of the original document D thus read. The image reading portion 1 includes optical system members for optically reading the original document D, such as a lamp 11, an image sensor 12, and so on. The lamp 11, the image sensor 12, and so on are housed inside a housing of the image reading portion 1 (a reading housing). A contact glass CG is provided on an upper surface of the reading housing. Further, the image reading portion 1 reads the original document D placed on the contact glass CG.

For example, an original document presser 13 for holding down the original document D placed on the contact glass CG is provided on the upper surface of the reading housing. FIG. 1 shows a state where the original document D is held down by the original document presser 13.

The image forming apparatus 100 is provided also with a printing portion 2. The printing portion 2 includes a paper feed portion 21, an image forming portion 22, and a fixing portion 23. The printing portion 2 prints an image on a paper sheet (including an after-mentioned sheet S).

The paper feed portion 21 feeds a paper sheet housed in a cassette to a paper sheet conveyance path (shown by a broken line in FIG. 1). The paper sheet fed to the paper sheet conveyance path is conveyed along the paper sheet conveyance path.

The image forming portion 22 includes mechanism portions 22Bk, 22Y, 22C, and 22M corresponding to colors of black (Bk), yellow (Y), cyan (C), and magenta (M), respectively. The mechanism portions 22Bk, 22Y, 22C, and 22M each form a toner image of a color corresponding thereto and primarily transfers the toner image onto an intermediate belt. The toner image thus transferred onto the intermediate belt is secondarily transferred onto the paper sheet being conveyed.

The fixing portion 23 applies pressure and heat to the paper sheet onto which the toner image has been transferred. This causes the toner image to be fixed on the papa sheet. The paper sheet on which the toner image has been fixed, namely, a printed paper sheet is conveyed as it is along the paper sheet conveyance path and then is discharged.

An operation panel 3 is provided in the image forming apparatus 100. The operation panel 3 includes a touch panel display 31. The touch panel display 31 displays a screen on which software keys, a message, and so on are arranged and accepts, from a user, a touch operation with respect to the screen thus displayed (the software keys). The operation panel 3 also includes a plurality of hardware keys 32. Examples of the hardware keys 32 include a start key for accepting a job execution command from a user.

Figure 2:
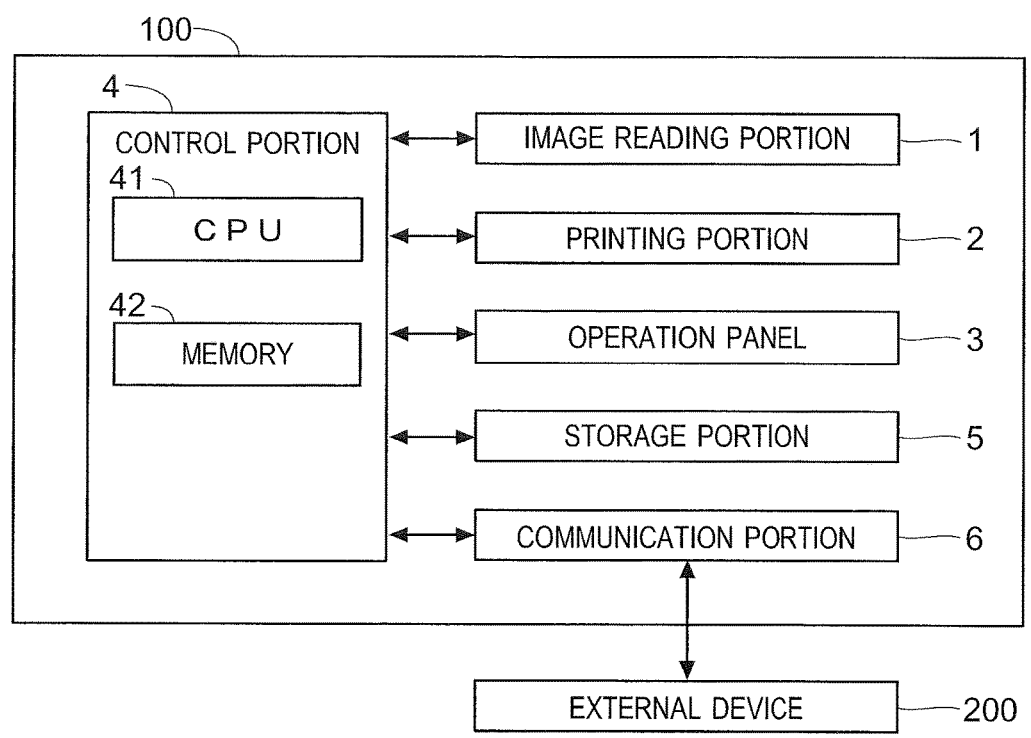
FIG. 2 is a view showing a hardware configuration of the image forming apparatus according to one embodiment of the present disclosure.

As shown in FIG. 2, the image forming apparatus 100 is provided also with a control portion 4. The control portion 4 is connected to the image reading portion 1 and controls a reading operation of the image reading portion 1. Furthermore, the control portion 4 is connected to the printing portion 2 and controls a printing operation of the printing portion 2. Moreover, the control portion 4 is connected to the operation panel 3. Further, the control portion 4 controls a display operation of the touch panel display 31 and also detects a touch operation with respect to the touch panel display 31 (the software keys) and a press-down operation with respect to the hardware keys 32.

The control portion 4 includes a CPU 41 and a memory 42. The CPU 41 operates based on control programs and data and performs processes for controlling the various portions. The memory 42 stores programs and data for operating the CPU 41.

Furthermore, the control portion 4 performs a character recognition process of recognizing characters included in image data of the original document D (information described in the original document D) obtained through reading of the original document D by the image reading portion 1. The control portion 4 performs the character recognition process with respect to the image data of the original document D and thus extracts text from the image data of the original document D. The character recognition process by the control portion 4 uses, for example, the OCR (optical character recognition) technology.

The character recognition process by the control portion 4 uses character patterns for pattern matching (standard patterns). When performing the character recognition process, the control portion 4 extracts a character image from image data of the original document D and also performs a process of comparing the character patterns stored in a character database with the character image thus extracted (a matching process). Then, based on a result of the matching process, the control portion 4 recognizes a character included in the image data of the original document D.

The image forming apparatus 100 is provided also with a storage portion 5. The storage portion 5 includes a non-volatile storage device such as a ROM (for example, an EEPROM) or an HDD. The control portion 4 is connected to the storage portion 5 and performs reading of data from and writing of data into the storage portion 5. For example, after-mentioned schedule data SD (see FIG. 4) is stored in the storage portion 5.

The image forming apparatus 100 is provided also with a communication portion 6. The communication portion 6 includes a communication circuit, a memory, and a communication connector. The control portion 4 is connected to the communication portion 6 and communicates, via the communication portion 6, with a user terminal 200 that is used by a user of the image forming apparatus 100. The user terminal 200 is a personal computer or a portable information terminal (a smartphone or a tablet terminal). For example, the control portion 4 communicates with the user terminal 200 via the communication portion 6 and obtains the after-mentioned schedule data SD (see FIG. 4) from the user terminal 200.

<Schedule Updating Function>

Figures 3, 4:
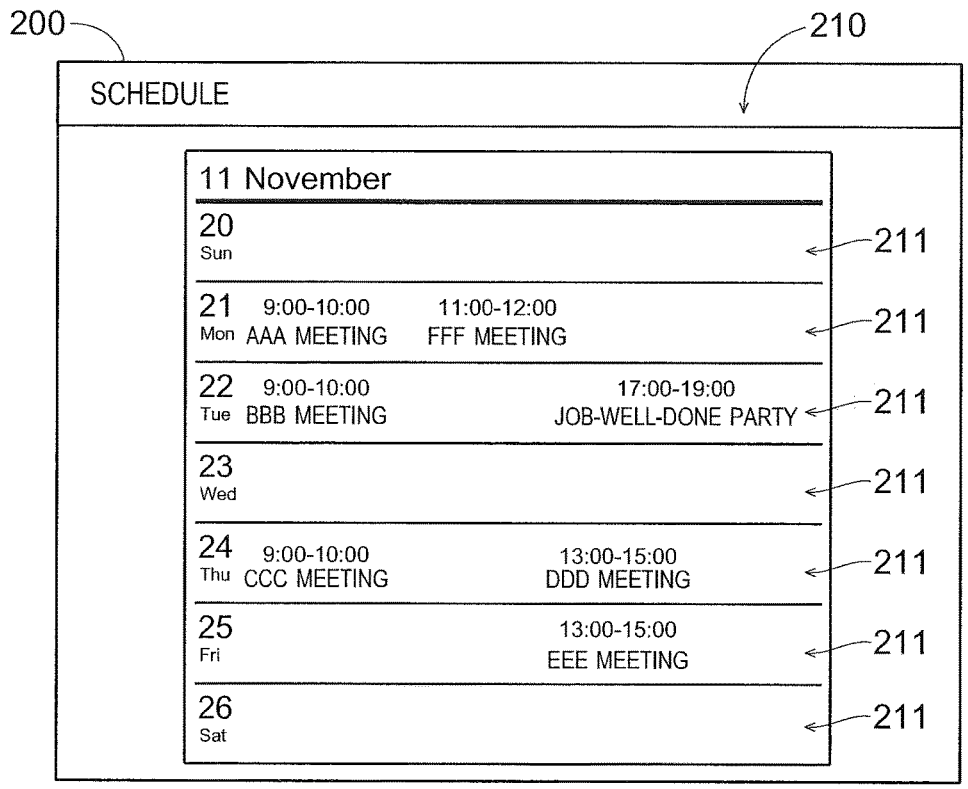
FIG. 3 is a view showing one example of a schedule screen displayed on a user terminal used by a user of the image forming apparatus according to one embodiment of the present disclosure.
FIG. 4 is a conceptual view showing schedule data (data for displaying the schedule screen) obtained from the user terminal by the image forming apparatus according to one embodiment of the present disclosure.

The image forming apparatus 100 is equipped with a schedule updating function. In a case of using the schedule updating function, it is necessary that a dedicated application (hereinafter, referred to as a schedule application) be installed on, as the user terminal 200, a user terminal that is communicable with the image forming apparatus 100. Upon start-up of the schedule application installed on the user terminal 200, for example, a schedule screen 210 as shown in FIG. 3 is displayed on the user terminal 200. On the schedule screen 210, there are arranged a plurality of input display fields 211 corresponding to a plurality of dates, respectively. Upon a user's operation of designating any of the plurality of input display fields 211 and inputting text indicating an action schedule or the like, the text thus inputted is displayed in the any of the plurality of input display fields 211 thus designated by the user.

The user terminal 200 recognizes pieces of information included in the plurality of input display fields 211 as pieces of schedule information 10 and stores the schedule data SD that is obtained by associating the pieces of schedule information 10 with the plurality of dates, respectively. For example, pieces of schedule data SD including pieces of schedule information 10 corresponding to several days to several months (for example, one week), respectively, are compiled into one file. FIG. 4 shows a conceptual view of the schedule data SD. The schedule data SD shown in FIG. 4 corresponds to schedules for a period from November 20th to 26th shown in FIG. 3. In the schedule data SD shown in FIG. 4, as the schedule information 10, a piece of information indicating that no text has been inputted (there is no schedule) is associated with each of dates of November 20th, 23rd, and 26th.

When displaying the schedule screen 210 (see FIG. 3), the user terminal 200 refers to the schedule data SD. Then, with respect to each date (each of the input display fields 211), the user terminal 200 recognizes a corresponding piece of schedule information 10 and displays text indicated by said recognized piece of schedule information 10 in a corresponding one of the input display fields 211. Any of the plurality of input display fields 211 in which no text has been inputted so far is left blank.

In a case where a user has performed a schedule update (such as by inputting, deleting, and changing text) while the schedule screen 210 is displayed, the user terminal 200 updates the schedule data SD. This makes it possible to make the user terminal 200 function as an electronic diary (an appointment book).

Figure 5:
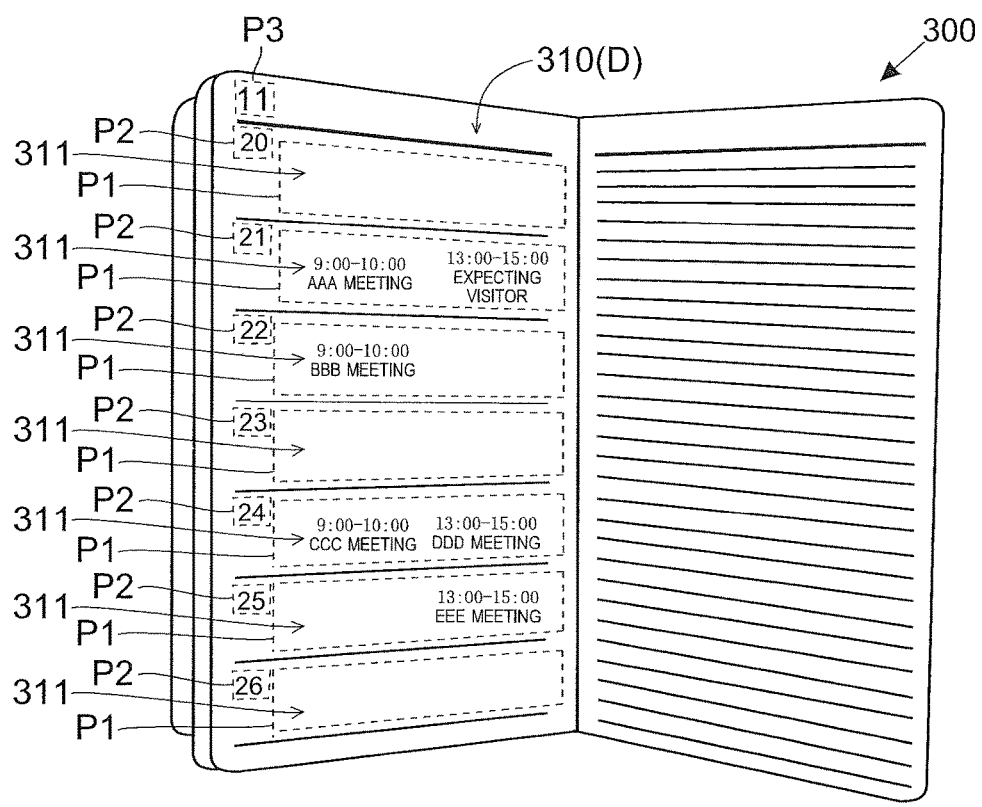
FIG. 5 is a view showing one example of an original document (a schedule page of a pocket diary) read by the image forming apparatus according to one embodiment of the present disclosure.

Furthermore, the schedule updating function enables an update on information described in the original document D as shown in FIG. 5. The original document D to be updated is a schedule page 310 of a pocket diary 300. The schedule page 310 includes a plurality of description fields 311 bearing different dates from each other (in FIG. 5, November 20th to 26th).

In a case of updating information described on the schedule page 310 by using the schedule updating function, it is necessary that a format of the schedule page 310 be registered. The schedule updating function is not available for unregistered pocket diaries. For example, the pocket diary 300 to be registered is placed on the image forming apparatus 100 (the contact glass CG of the image reading portion 1), and a command to execute format registration is given to the operation panel 13, thus causing a process related to the format registration to be started in the image forming apparatus 100.

Upon the operation panel 3 receiving the command to execute the format registration, the control portion 4 controls the image reading portion 1 to read the schedule page 310 and the operation panel 3 to display a preview image of the schedule page 310. Then, the control portion 4 controls the operation panel 3 to accept setting (format setting) related to the format registration.

In the format setting, a position of each of the description fields 311, positions of a date (a month and a day) borne so as to correspond to the each of the description fields 311, and so on are set. In the schedule page 310 shown in FIG. 5, a position P1 is set as a position of each of the description fields 311, a position P2 is set as a position of a date (a day) corresponding thereto, and a position P3 is set as the date (a month) corresponding thereto.

Color setting is also performed as the setting related to the schedule updating function. In the color setting, a piece of information to be possibly described on the schedule page 310 is registered, and a color associated with said piece of information thus registered is set. The thus pre-registered piece of information and the color associated therewith are stored in the storage portion 5. For example, a color associated with a registered piece of information can be set to vary depending on the degree of importance or a category of the registered piece of information.

Moreover, abbreviation setting is also performed as the setting related to the schedule updating function. In the abbreviation setting, an abbreviation (corresponding to "first information") to be possibly described on the schedule page 310 and a full form of the abbreviation (corresponding to "second information") are set and registered. The thus pre-registered abbreviation and the full form associated therewith are stored in the storage portion 5.

After the format of the schedule page 310 has been registered, with the schedule updating function set to be enabled, the image forming apparatus 100 is operated to read the schedule page 310 of the pocket diary 300, so that a schedule updated on a user terminal 200 side can be reflected on the schedule page 310 of the pocket diary 300, and a schedule updated on a pocket diary 300 side can be reflected in the schedule data SD in the user terminal 200.

A process related to the schedule updating function (hereinafter, referred to as an "updating process") is performed by the control portion 4. With reference to a flow chart shown in FIG. 6, the following describes a flow of the updating process performed by the control portion 4.

Figure 6:
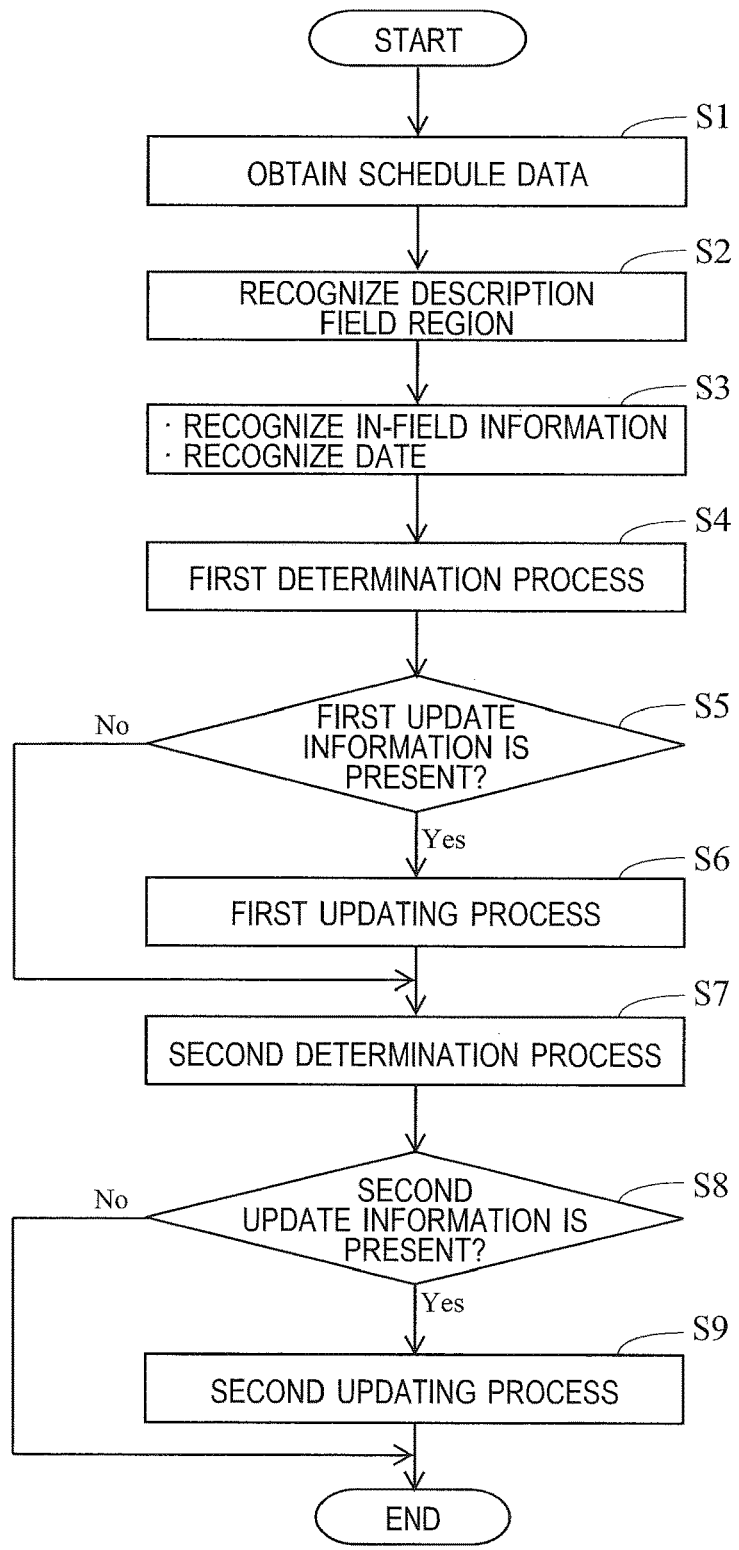
FIG. 6 is a flow chart showing a flow of an updating process performed by the image forming apparatus according to one embodiment of the present disclosure.
Figure 7:
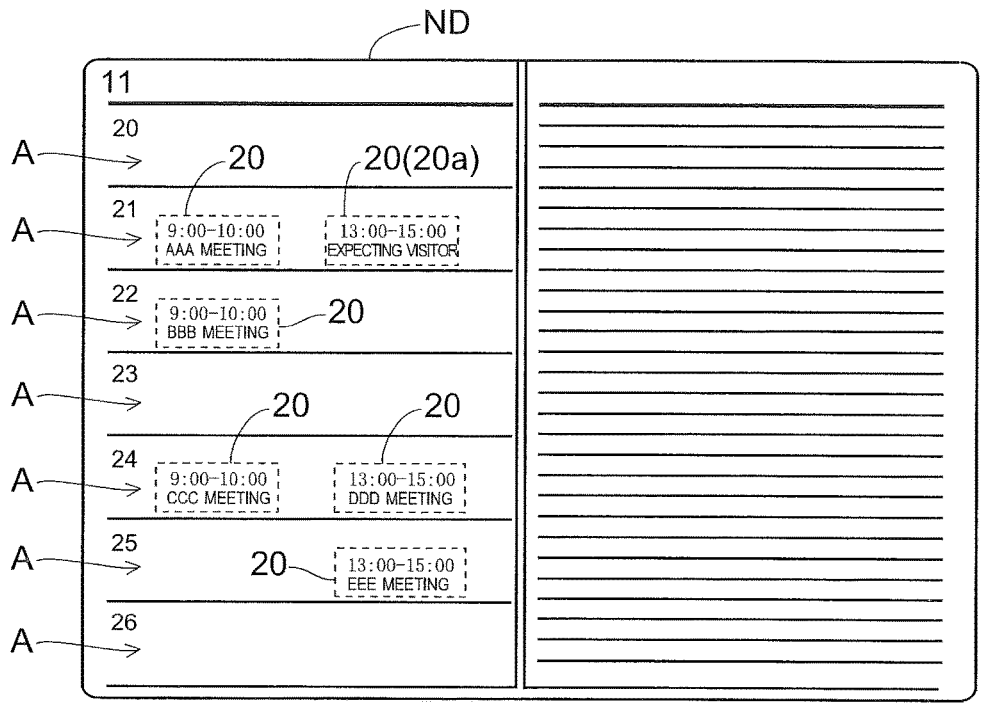
FIG. 7 is a view showing image data of the original document read by the image forming apparatus according to one embodiment of the present disclosure.

The flow chart shown in FIG. 6 starts when generation of image data of the schedule page 310 obtained by reading the schedule page 310 by the image reading portion 1 has been completed. At this time, image data as shown in FIG. 7 is generated by the image reading portion 1. In the following description, the image data of the schedule page 310 generated by the image reading portion 1 is denoted as ND and referred to as pocket diary data ND.

At step S1 in the flow chart shown in FIG. 6, the control portion 4 recognizes a user who has currently logged in to the image forming apparatus 100 and communicates, via the communication portion 6, with the user terminal 200 used by said user thus recognized. Then, the control portion 4 obtains the schedule data SD (see FIG. 4) from the user terminal 200 communicating therewith and controls the storage portion 5 to store said schedule data SD thus obtained. A portable storage device (such as a USB memory stick) storing the schedule data SD may be connected to the image forming apparatus 100. In this case, the control portion 4 obtains the schedule data SD from the portable storage device connected to the image forming apparatus 100.

At step S2, the control portion 4 checks settings set in format setting and recognizes a plurality of description field regions A (see FIG. 7) in the pocket diary data ND corresponding to the plurality of description fields 311 (see FIG. 5), respectively. At this time, as the description field regions A, regions corresponding to a plurality of the positions P1 set in the format setting are recognized by the control portion 4.

At step S3, with respect to each of the plurality of description field regions A, the control portion 4 performs a process in which in-field information 20 (see FIG. 7) that is information included in the each of the plurality of description field regions A is recognized in association with a date of one of the description fields 311 which corresponds to the each of the plurality of description field regions A. At this time, the control portion 4 recognizes the in-field information 20 included in the each of the plurality of description field regions A by performing the character recognition process with respect to the pocket diary data ND. Moreover, the control portion 4 checks the positions P2 and P3 set in the format setting and recognizes, based on information (a numeral) present in each of regions in the pocket diary data ND which correspond to the positions P2 and P3, respectively, the date of the one of the description fields 311 which corresponds to the each of the plurality of description field regions A.

At step S4, the control portion 4 determines, as a subject period, a schedule period of the schedule page 310 corresponding to the pocket diary data ND. The schedule period of the schedule page 310 corresponding to the pocket diary data ND shown in FIG. 7 is a period from November 20th to 26th. Furthermore, the control portion 4 extracts, as a subject of an updating process, a piece of schedule data SD (see FIG. 4) corresponding to the subject period.

Subsequently, from a plurality of pieces of schedule information 10 corresponding to a plurality of dates (pieces of schedule information 10 corresponding to dates within the subject period), respectively, and a plurality of pieces of in-field information 20 corresponding to the plurality of dates (pieces of in-field information 20 corresponding to the dates within the subject period), respectively, the control portion 4 extracts a piece of schedule information 10 and a piece of in-field information 20 which correspond to a common date as first subject information and second subject information, respectively. Then, the control portion 4 performs a first determination process in which information that is present in the first subject information 10 and absent in the second subject information 20 is determined as first update information (an updated piece of information updated on the user terminal 200 side).

At this time, the control portion 4 first extracts one of the plurality of pieces of schedule information 10 corresponding to the dates within the subject period, respectively, and sets it as the first subject information 10. Furthermore, the control portion 4 extracts, from the plurality of pieces of in-field information 20 corresponding to the dates within the subject period, respectively, one corresponding to a common date as the first subject information 10, and sets it as the second subject information 20. Then, the control portion 4 performs a comparison between the first subject information 10 and the second subject information 20 and determines, based on a result of the comparison, whether or not the first update information is present (performs the first determination process). After that, the control portion 4 sets, as a new piece of first subject information 10, one of the plurality of schedule information 10 corresponding to the dates within the subject week, respectively, which has not yet been a subject of the first determination process. The control portion 4 also sets, as a new piece of second subject information 20, one of the plurality of pieces of in-field information 20 corresponding to the dates within the subject week, respectively, which corresponds to a common date as the new piece of first subject information 10. Then, the control portion 4 performs the first determination process again with respect to the new piece of first subject information (and the new piece of second subject information). The control portion 4 performs the first determination process once with respect to each of all the pieces of schedule information 10 (in-field information 20) corresponding to the dates within the subject week, respectively.

At step S5, the control portion 4 determines whether or not the first update information is present. For example, in an example shown in FIG. 4 and FIG. 7, while information 10a (see FIG. 4) is present in a piece of schedule information 10 corresponding to November 21st, there is no information corresponding to the information 10a in a piece of in-field information 20 corresponding to November 21st. Furthermore, while information 10b (see FIG. 4) is present in a piece of schedule information 10 corresponding to November 22nd, there is no information corresponding to the information 10b in a piece of in-field information 20 corresponding to November 22nd. Accordingly, each of the information 10a and the information 10b among the pieces of schedule information 10 is determined as the first update information. That is, the control portion 4 judges that the first update information is present.

Referring back to FIG. 6, in a case where, at step S5, the control portion 4 has judged that the first update information is present, a transition is made to step S6. Upon the transition to step S6, the control portion 4 performs a first updating process (a detail thereof will be described later) as one process step of the updating process. After that, a transition is made to step S7. Also in a case where, at step S5, the control portion 4 has judged that the first update information is absent, a transition is made to step S7.

Upon the transition to step S7, from the plurality of pieces of schedule information 10 corresponding to the plurality of dates (the pieces of schedule information 10 corresponding to the dates within the subject period), respectively, and the plurality of pieces of in-field information 20 corresponding to the plurality of dates (the pieces of in-field information 20 corresponding to the dates within the subject period), respectively, the control portion 4 extracts a piece of schedule information 10 and a piece of in-field information 20 which correspond to a common date as the first subject information and the second subject information, respectively. Then, the control portion 4 performs a second determination process in which information that is absent in the first subject information 10 and present in the second subject information 20 is determined as second update information (an updated piece of information updated on the pocket diary 300 side). Similarly to the first determination process, the second determination process is performed once with respect to each of all the pieces of schedule information 10 (in-field information 20) corresponding to the dates within the subject period, respectively.

At step S8, the control portion 4 determines whether or not the second update information is present. For example, in the example shown in FIG. 4 and FIG. 7, while information 20a (see FIG. 7) is present in a piece of in-field information 20 corresponding to November 21st, there is no information corresponding to the information 20a in a piece of schedule information 10 corresponding to November 21st. Accordingly, the information 20a among the pieces of in-field information 20 is determined as the second update information. That is, the control portion 4 judges that the second update information is present.

Referring back to FIG. 6, in a case where, at step S8, the control portion 4 has judged that the second update information is present, a transition is made to step S9. Upon the transition to step S9, the control portion 4 performs a second updating process (a detail thereof will be described later) as one process step of the updating process. Then, this flow is ended. In a case where, at step S8, the control portion 4 has judged that the second update information is absent, this flow is ended without performing the second updating process.

Figure 8:
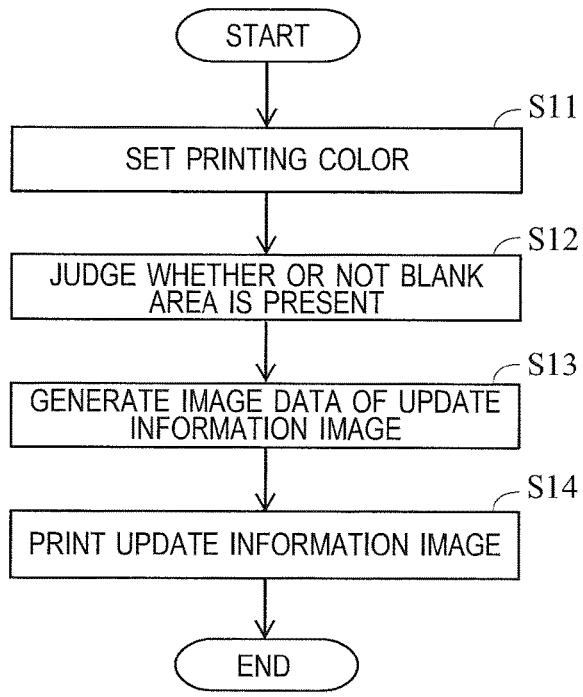
FIG. 8 is a flow chart showing a flow of a first updating process performed by the image forming apparatus according to one embodiment of the present disclosure.

With reference to a flow chart shown in FIG. 8, the following describes a flow of the first updating process performed by the control portion 4. In the first updating process, printing of an after-mentioned update information image 400 (see FIG. 10) is performed.

Figure 9:
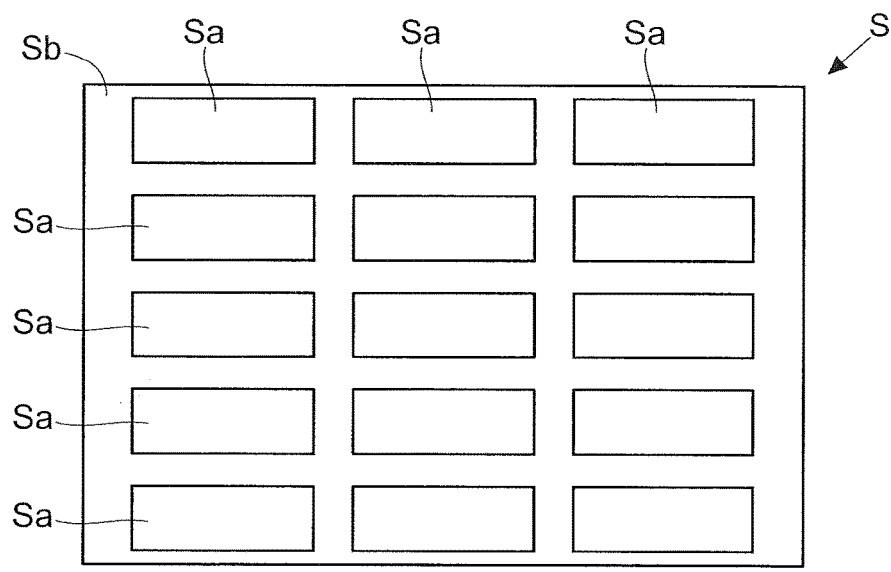
FIG. 9 is a view showing one example of a sheet used when an update information image is printed by the image forming apparatus according to one embodiment of the present disclosure.

In printing the update information image 400, the sheet S as shown in FIG. 9 is prepared in advance. The sheet S is composed of an attachment sheet Sa and a base sheet Sb. The attachment sheet Sa has an adhesive layer provided on a surface thereof opposite to a printing surface thereof, and a plurality of the attachment sheets Sa are arranged on the base sheet Sb. Furthermore, the attachment sheet Sa can be peeled off from the base sheet Sb. The attachment sheet Sa is formed of a seal, a sticky note, or the like, though not particularly limited thereto. Further, the update information image 400 is printed on the attachment sheet Sa.

At step S11 of the flow chart shown in FIG. 8, the control portion 4 performs setting of a printing color used in printing the update information image 400. At this time, the control portion 4 judges whether or not a piece of information registered in the color setting is included in the first update information. Then, in a case where the registered piece of information is included in the first update information, the control portion 4 sets, as the printing color, a color corresponding to the registered piece of information included in the first update information. On the other hand, in a case where the registered piece of information is not included in the first update information, the control portion 4 sets the printing color to a default color.

At step S12, the control portion 4 judges whether or not a blank area is present. At this time, based on the pocket diary data ND, the control portion 4 judges whether or not a blank area (an unfilled area in which no information has been filled) larger in size than the update information image 400 (the attachment sheet Sa) is present in one of the description fields 311 (see FIG. 5) which bears a date corresponding to the first update information. In the following description, the one of the description fields 311 which bears the date corresponding to the first update information is referred to as a subject description field 311.

At step S13, the control portion 4 generates image data necessary for printing the update information image 400 (see FIG. 10) indicating the first update information. At this time, the control portion 4 generates the image data so that a color of the update information image 400 is the previously set printing color (the color set at step S11). Or alternatively, the control portion 4 generates the image data so that a background color of the update information image 400 is the previously set printing color (the color set at step S11).

When generating the image data of the update information image 400, the control portion 4 sets a size of the image data of the update information image 400 so that the size is equal to that of the attachment sheet Sa. Furthermore, the control portion 4 adds, to the update information image 400, a date image 401 (see FIG. 10) indicating the date corresponding to the first update information.

Moreover, when no blank area is present in the subject description field 311, the control portion 4 adds, to the update information image 400, an arrow image 402 (see FIG. 10) that is directed to the subject description field 311 in a case where the attachment sheet Sa on which the update information image 400 has been printed is attached outside the subject description field 311. In a case where a blank area is present in the subject description field 311, the arrow image 402 is not added to the update information image 400.

Figure 10:
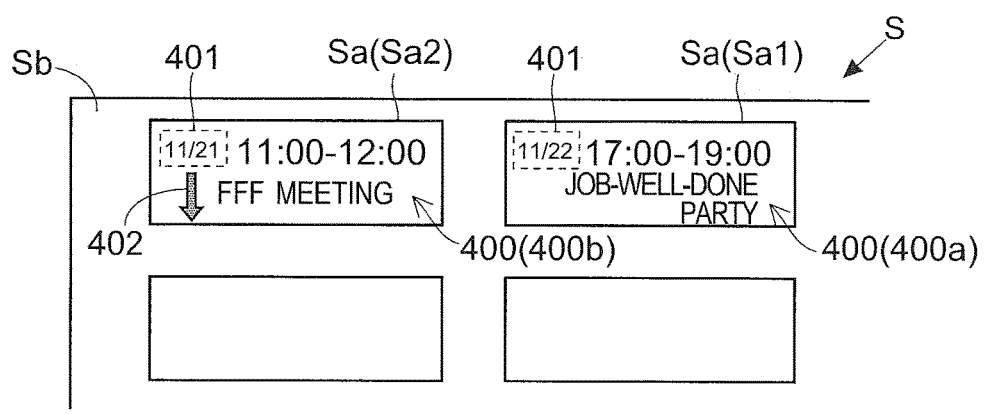
FIG. 10 is a view showing a state where the update information image has been printed on the sheet shown in FIG. 9.

At step S14, the control portion 4 controls the printing portion 2 to perform printing of only the update information image 400 on the attachment sheet Sa. FIG. 10 shows the sheet S having the attachment sheet Sa on which the update information image 400 has been printed.

Figure 11:
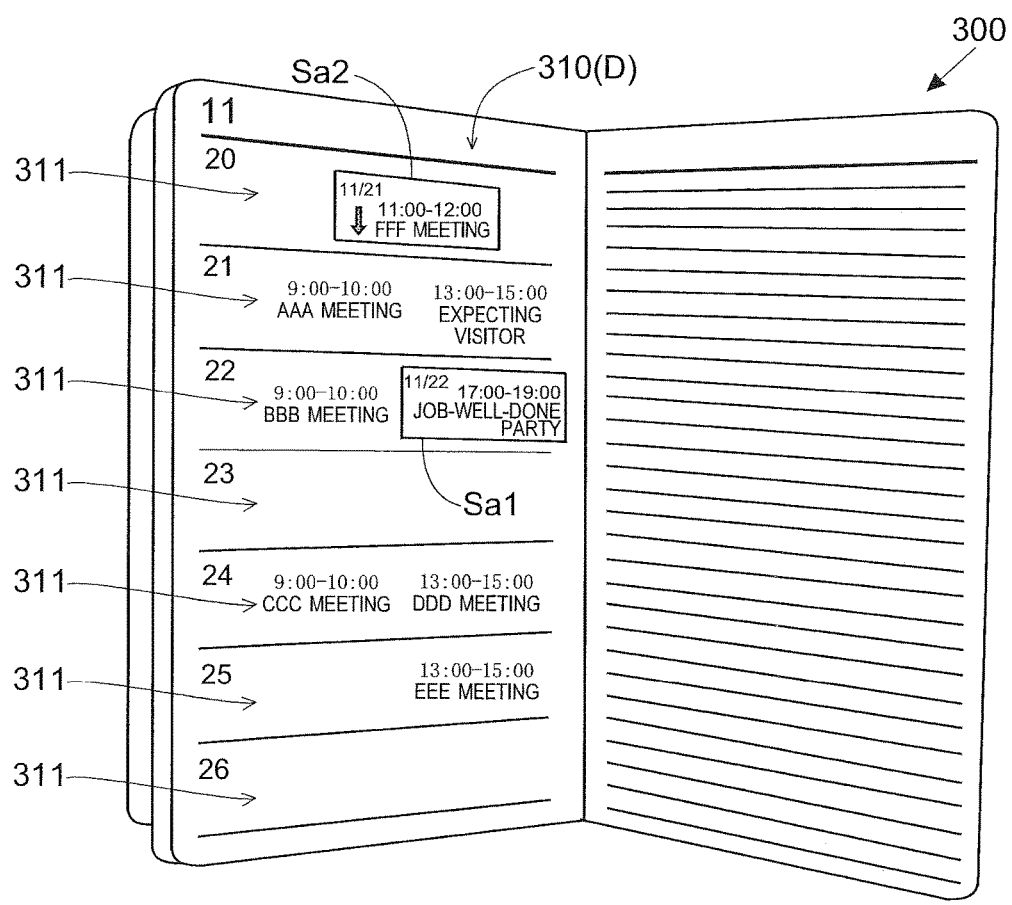
FIG. 11 is a view showing a state where the sheet shown in FIG. 10 is attached to the original document.

In an example shown in FIG. 10, an image denoted by a reference character 400a as the update information image 400 includes an image indicating "11/22 (November 22nd)" as the date image 401, and thus the update information image 400a is a text image indicating an action schedule corresponding to November 22nd (herein, the attachment sheet Sa on which the update information image 400a has been printed is referred to as an attachment sheet Sa1). Accordingly, as shown in FIG. 11, on the schedule page 310 of the pocket diary 300, the attachment sheet Sa1 is attached to one of the description fields 311 which corresponds to November 22nd, and thus contents of the schedule data SD updated on the user terminal 200 side can be reflected on information described on the schedule page 310 of the pocket diary 300.

Furthermore, in the example shown in FIG. 10, an image denoted by a reference character 400b as the update information image 400 includes an image indicating "11/21 (November 21st)" as the date image 401, and thus the update information image 400b is a text image indicating an action schedule corresponding to November 21st (herein, the attachment sheet Sa on which the update information image 400b has been printed is referred to as an attachment sheet Sa2). Here, as shown in FIG. 11, on the schedule page 310 of the pocket diary 300, there is no blank area for attaching the attachment sheet Sa2 on one of the description fields 311 which corresponds to November 21st. The update information image 400b, however, includes an image of a downward arrow as the arrow image 402. Accordingly, even when the attachment sheet Sa2 is attached to a blank area (one of the description fields 311 which corresponds to November 20$^{th}$) present outside the one of the description fields 311 which corresponds to November 21st, it can be understood at a glance that the action schedule indicated by the attachment sheet Sa2 corresponds to November 21st.

Figures 12, 13:
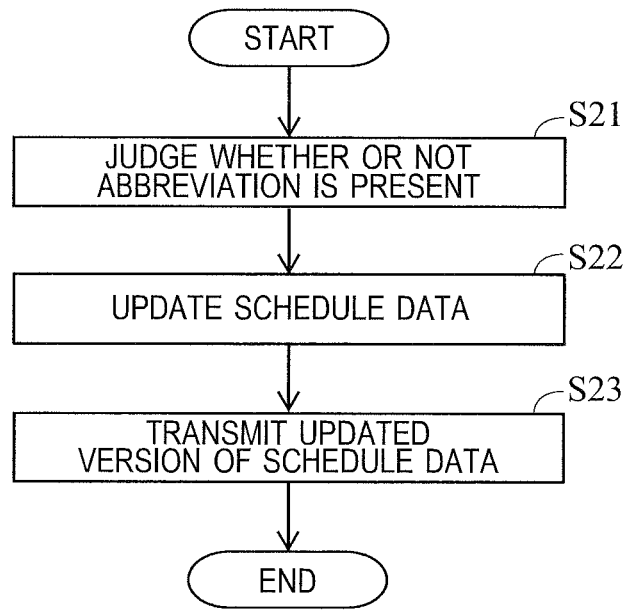
FIG. 12 is a flow chart showing a flow of a second updating process performed by the image forming apparatus according to one embodiment of the present disclosure.
FIG. 13 is a conceptual view showing schedule data updated by the image forming apparatus according to one embodiment of the present disclosure.

With reference to a flow chart shown in FIG. 12, the following describes a flow of the second updating process performed by the control portion 4. In the second updating process, the schedule data SD used at the user terminal 200 is updated.

At step S21, the control portion 4 judges whether or not an abbreviation set by the abbreviation setting is included in the second update information (judges whether or not an abbreviation is present). Then, at step S22, the control portion 4 recognizes a date corresponding to the second update information and adds the second update information to a piece of schedule information 10 corresponding to said date thus recognized. That is, the control portion 4 updates pieces of schedule data SD corresponding to dates within a subject period, respectively. At this time, when the abbreviation set by the abbreviation setting is included in the second update information, the control portion 4 replaces the abbreviation (first information) included in the second update information with a corresponding full form (second information). In a case where the abbreviation set by the abbreviation setting is not included in the second update information, such information replacement is not performed.

For example, in the example shown in FIG. 4 and FIG. 7, while the information 20a (see FIG. 7) is present in the piece of in-field information 20 corresponding to November 21st, there is no information corresponding to the information 20a in the piece of schedule information 10 corresponding to November 21st. In this case, the control portion 4 adds a piece of information corresponding to the information 20a as a piece of schedule information 10 corresponding to November 21st (see FIG. 13).

Referring back to FIG. 12, at Step S23, the control portion 4 communicates with the user terminal 200 (the user terminal 200 used by a user who has currently logged in to the image forming apparatus 100) via the communication portion 6 and transmits an updated version of the schedule data SD to the user terminal 200. Thus, on the user terminal 200, there can be displayed the schedule screen 210 on which contents updated on the pocket diary 300 side are reflected.

As described above, in the configuration according to this embodiment, with the schedule updating function set to be enabled, the image forming apparatus 100 is operated to read the schedule page 310 of the pocket diary 300 (the schedule page 310 on which contents updated at the user terminal 200 has not yet been reflected), and then the update information image 400 is printed on the attachment sheet Sa. Here, the update information image 400 printed on the attachment sheet Sa is an image indicating the first update information (information added by an update performed at the user terminal 200). Accordingly, merely by attaching the attachment sheet Sa on which the update information image 400 has been printed to the schedule page 310, contents of the schedule data SD updated on the user terminal 200 side can be reflected on the schedule page 310.

Furthermore, in this embodiment, the control portion 4 adds the date image 401 indicating a date corresponding to the first update information to the update information image 400. That is, the date image 401 indicating the date corresponding to the first update information is printed on the attachment sheet Sa. Thus, among the plurality of description fields 311 arranged on the schedule page 310 of the pocket diary 300, one to which the attachment sheet Sa should be attached can be easily determined.

Furthermore, in this embodiment, based on the pocket diary data ND, the control portion 4 judges whether or not a blank area larger in size than the update information image 400 is present in one of the description fields 311 (the subject description field 311) which bears a date corresponding to the first update information. When there is no blank area in the subject description field 311, the control portion 4 adds, to the update information image 400, the arrow image 402 that is directed to the subject description field 311 in a case where the attachment sheet Sa on which the update information image 400 has been printed is attached outside the subject description field 311. Thus, even when the attachment sheet Sa is attached outside the subject description field 311, it can be understood that the first update information indicated by said attachment sheet Sa thus attached is a piece of information corresponding to the subject description field 311.

Furthermore, in this embodiment, in a case where a registered piece of information is included in the first update information, the control portion 4 sets, as the printing color, a color associated with the registered piece of information included in the first update information, and controls the printing portion 2 to perform printing (printing of the update information image 400 on the attachment sheet Sa) so that a color of the update information image 400 is the printing color thus set. Or alternatively, the control portion 4 controls the printing portion 2 to perform printing (printing of the update information image 400 on the attachment sheet Sa) so that a background color of the update information image 400 is the printing color thus set. Thus, a color of the update information image 400 (or a background of the update information image 400) can be set to vary based on a degree of importance or a category.

Furthermore, in this embodiment, the control portion 4 performs a process in which information that is absent in the first subject information and present in the second subject information is determined as the second update information and includes the second update information in the schedule data SD. Thus, an update performed with respect to the schedule page 310 can be reflected in the schedule data SD (data used when the user terminal 200 displays the schedule screen 210).

Furthermore, in this embodiment, in a case where a pre-registered abbreviation (the first information) is included in the second update information, the control portion 4 includes the second update information in the schedule data SD after replacing the abbreviation included in the second update information with a full form thereof (the second information). Thus, even when an abbreviation is written on the schedule page 310, when the schedule screen 210 is displayed on the user terminal 200, the abbreviation has been replaced with a full form thereof, and thus user's convenience is increased (there is no need to write a full form of the abbreviation on the schedule page 310).

The embodiment disclosed herein is to be construed in all respects as illustrative and not limiting. The scope of the present disclosure is indicated by the appended claims rather than by the foregoing description of the embodiment, and all changes that come within the meaning and range of equivalency of the claims are intended to be embraced therein.

What is claimed is:

1. An image forming apparatus, comprising:
a storage portion that stores schedule data that is obtained from a user terminal used by a user of the image forming apparatus and includes a plurality of pieces of schedule information corresponding to a plurality of dates, respectively;
an image reading portion that reads an original document including a plurality of description fields bearing different dates from each other and generates image data of the original document;
a printing portion that performs printing on a sheet; and
a control portion that, when generation of image data of the original document is completed, recognizes a plurality of description field regions in the image data of the original document which correspond to the plurality of description fields, respectively, performs a process in which, with respect to each of the plurality of description field regions, in-field information that is included in the each of the plurality of description field regions is recognized in association with a date borne by a corresponding one of the plurality of description fields, also performs a process in which one of the plurality of pieces of schedule information and a piece of the in-field information which correspond to a common date are extracted as first subject information and second subject information, respectively, and information that is present in the first subject information and absent in the second subject information is determined as first update information, and performs a process in which information that is absent in the first subject information and present in the second subject information is determined as second update information,
wherein
when the first update information is present, the control portion adds, to an update information image indicating the first update information, a date image indicating a date corresponds to the first update information and controls the printing portion to perform printing of the update information image on the sheet, and
when the second update information is present, the control portion includes the second update information in the schedule data and transmits the schedule data to the user terminal.

2. The image forming apparatus according to claim 1, wherein
based on the image data of the original document, the control portion judges whether or not a blank area larger in size than the update information image is present in a subject description field that is one of the plurality of description fields which bears a date corresponding to the first update information, and when the blank area is not present in the subject description field, the control portion adds, to the update information image, an arrow image that is directed to the subject description field in a case where the sheet on which the update information image has been printed is attached outside the subject description field.

3. The image forming apparatus according to claim 1, wherein
the storage portion stores a piece of information registered in advance and a color associated therewith, and
in a case where the registered piece of information is included in the first update information, the control portion sets, as a printing color, a color associated with the registered piece of information included in the first update information, and controls the printing portion to perform printing so that a color of the update information image is the printing color thus set, or alternatively, controls the printing portion to perform printing so that a background color of the update information image is the printing color thus set.

4. The image forming apparatus according to claim 1, wherein
the sheet on which the update information image is printed has an adhesive layer provided on a surface thereof opposite to a printing surface thereof.

5. The image forming apparatus according to claim 1, wherein
the storage portion stores a piece of first information registered in advance and a piece of second information associated therewith, and
in a case where the piece of first information is included in the second update information, the control portion includes the second update information in the schedule data after replacing the piece of first information included in the second update information with the piece of second information.

* * * * *